United States Patent
Scruggs et al.

(10) Patent No.: US 6,441,556 B1
(45) Date of Patent: Aug. 27, 2002

(54) INTEGRATED FAULT PROTECTION FOR SWITCHED ELECTRONIC SYSTEMS FOR SATELLITE APPLICATIONS

(75) Inventors: Michael K. Scruggs, Pompton Plains; James Jentes, Passaic; Serdar T. Sozusen, Pinebrook, all of NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/721,002

(22) Filed: Nov. 22, 2000

Related U.S. Application Data
(60) Provisional application No. 60/167,366, filed on Nov. 24, 1999.

(51) Int. Cl.[7] .............................. H05B 37/00
(52) U.S. Cl. ......................... 315/127; 361/63
(58) Field of Search ................ 315/127, 128, 315/299, 307, 362; 361/63, 88, 89, 93, 94

(56) References Cited

U.S. PATENT DOCUMENTS

| | | | |
|---|---|---|---|
| 5,416,689 A | 5/1995 | Silverstein et al. ........... 363/56 |
| 5,617,012 A * | 4/1997 | Murakami ................... 323/207 |
| 5,708,576 A | 1/1998 | Jones et al. .................... 363/56 |
| 5,767,631 A | 6/1998 | Konopka et al. ............ 315/307 |
| 5,973,896 A * | 10/1999 | Hirsh et al. ................... 361/54 |

FOREIGN PATENT DOCUMENTS

JP 8-30340 2/1996 ............. G05F/1/56

* cited by examiner

Primary Examiner—Don Wong
Assistant Examiner—Thuy Vinh Tran
(74) Attorney, Agent, or Firm—Loria B. Yeadon

(57) ABSTRACT

An integrated fault circuit includes a fault switch interposed between an input power source and an electronic subsystem power bus. A power converter is connected to the electronic subsystem power bus and converts power derived therefrom to at least one voltage output to supply power to an electronic subsystem and at least one fault protection output controlling the fault switch. A fault detection circuit is operatively connected to detect an out of range current on the electronic subsystem power bus and has at least one fault detection output connected to the power converter. When the out of range current is detected on the electronic subsystem bus, the fault detection circuit instructs the power converter, via the at least one fault detection output, to open the fault switch, thereby isolating the input power from the electronic subsystem bus.

Figure 1:
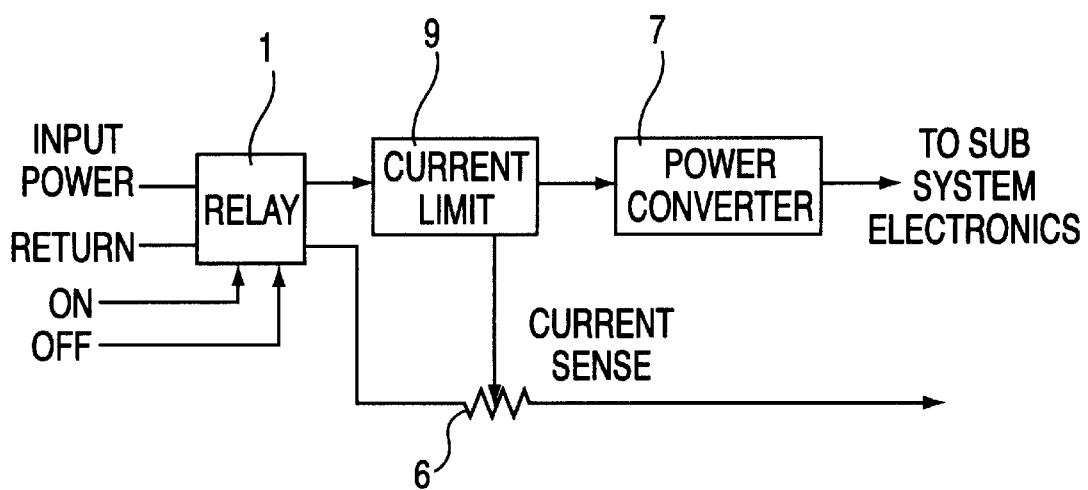

6 Claims, 2 Drawing Sheets

INTEGRATED FAULT PROTECTION FOR SWITCHED ELECTRONIC SYSTEMS FOR SATELLITE APPLICATIONS

CROSS REFERENCE TO RELATED APPLICATIONS

This application claims the benefit of U.S. Provisional Application No. 60/167,366, filed on Nov. 24, 1999.

FIELD OF THE INVENTION

The present invention relates generally to fault protection, and more specifically to integrated fault protection for switched electronic systems for satellite applications.

BACKGROUND OF THE INVENTION

In spacecraft systems, power is distributed from power sources (i.e. batteries, solar cells, fuel cells, etc.) to each subsystem using power control electronics. The power control electronics consist typically of combinations of relays, solid state switches, power converters and a computer to manage spacecraft power resources and load control. This solution represents a large cost to the satellite manufacturer, since the power distribution system must be customized for each electronic subsystem in terms of load management (control as well as amperage). The satellite manufacturer has to consider power generation, power control and bus loading to minimize power consumption.

With emphasis towards lower cost and standardization, the power control and protection elements are being pushed from the satellite bus distribution system to the electronic subsystem level. While this results in a simpler satellite power bus system, an additional level of complexity is consequently added to the subsystem design, requiring the subsystem to perform the load management control (switching ON/OFF) and to protect the bus from internal subsystem failures. These functions are often implemented using relays or solid state switches for load management and current limiters to protect the satellite bus from failures. Often electronic subsystems also contain a power converter to provide for various voltages required by the electronics and to maintain bus isolation. These functions are implemented using standard circuits readily known by those practicing in the art of electronic design.

In conventional systems, the power converter and bus protection circuits are treated as separate functions. Typical bus protection circuit elements consist of a power switching relay to provide for load management and offer total isolation in the OFF mode to minimize power consumption. Typically, a latching relay is used to allow system control with pulsed commands applied to the relay coils. This is done to minimize the amount of control power required and to simplify the system control.

Current limiting circuitry is also employed after the relay to limit bus currents when power is applied. This protects the relay contacts and the power bus from high current spikes that would be incurred as the bus voltage charges various capacitors and filters in the subsystem electronics.

In addition to limiting inrush currents, fault current protection is required to protect the power bus in the advent of a subsystem component failure resulting in a short circuit condition. The loss of the power bus could render the operation of the satellite useless and result in a large financial loss, considering the costs of the satellite as well as the launch vehicle. Typically, the inrush and fault current limiting is implemented with solid state switches and power control electronics to sense currents and voltages and control the bus current levels to a safe value.

In the prior art, the bus protection, power control and local voltage regulation are typically constructed as separate circuit elements, thus adding complexity and cost to the subsystem. A block diagram illustrating the prior art concept is displayed in FIG. 1 depicting the series combination of a power relay 1, a current limit circuit 9, a voltage regulation or power converter 7 and current sensing circuitry 6.

Therefore a need exists for a cost effective apparatus and method to integrate the power converter with the bus protection circuitry, to thereby realize the required load management and protection without undue complexity at the subsystem level. opens (OFF) and power is supplied to power converter 7 via power bus 11 and diode 8b. The start switch then remains OFF until the power is recycled (OFF/ON) at relay 1, at which time the startup procedure is repeated.

Meanwhile, a fault current detector 5 monitors a current sense circuit 6 continually to detect faults in the subsystem. A fault is detected when an out of range current is detected on the return path 11a of switched bus 11. The fault may be a result of, for example, a subsystem component failing and consequently causing a short circuit on the power bus. In such a case the current in the return path 11a would increase, with the increase being detected by the fault current detector 5 via the current sense circuit 6.

When a fault is detected by the fault current detector 5, the power converter 7 is effectively shut down by the fault current detector 5. The drive power is consequently removed from fault switch 2, thereby opening fault switch 2 and disconnecting the fault from the relay 1 and input power bus 12. Accordingly, relay 1 and input power bus 12 are protected from high fault currents. An optional status output 13 of the fault current detector 5 may be monitored to provide fault status.

Figure 2:
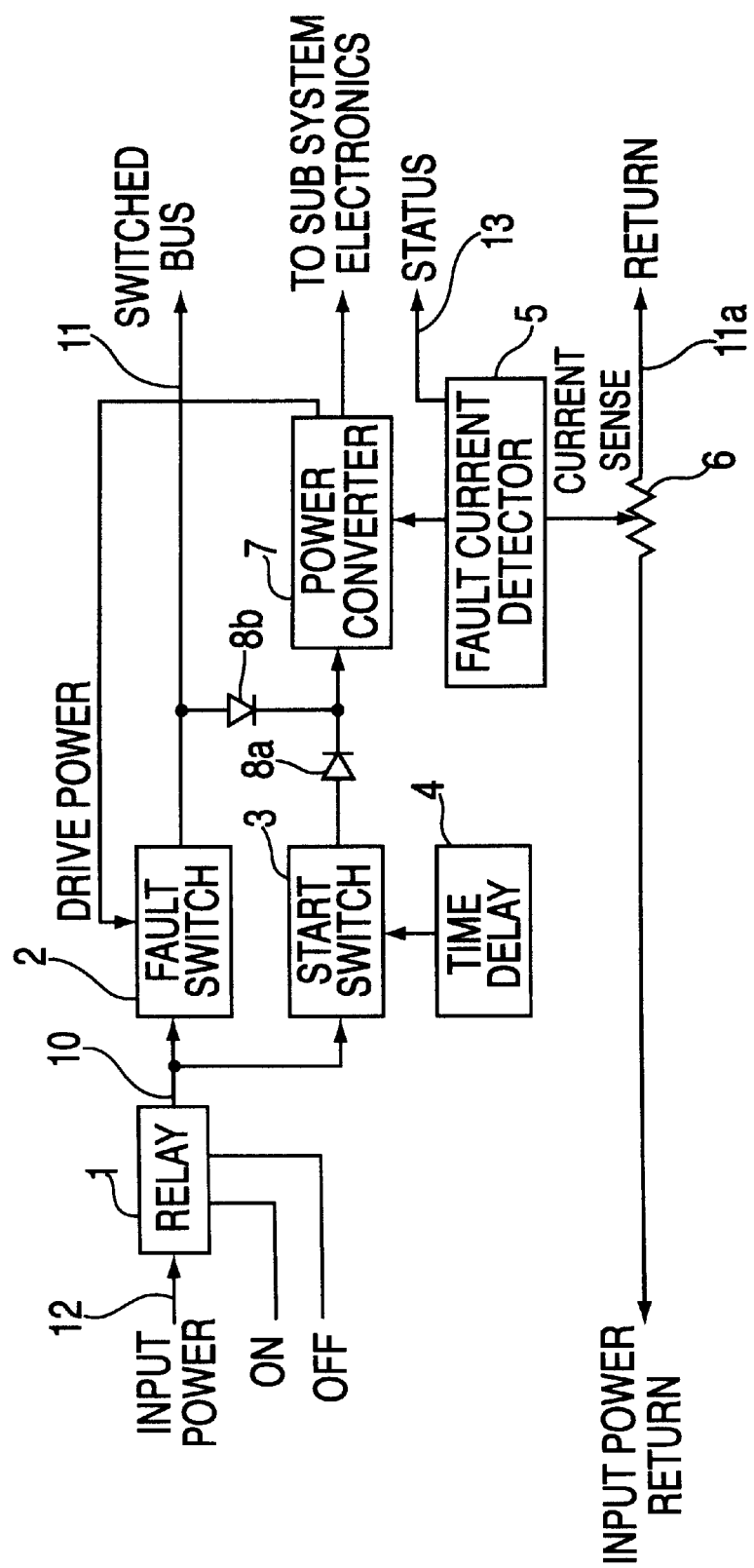

The circuit of FIG. 2 also provides fail safe operation with respect to converter failure. That is, an operational failure of the power converter 7 will automatically remove the drive power from fault switch 2, thereby removing power from the switched bus 11. Accordingly, further protection is provided, since a possible failure mode, in which the power convert 7 no longer provides current to the subsystem electronics while the switched bus is still powered and not isolated, is prevented.

The circuit of FIG. 2 may also be used to protect relay 1 and input power bus 12 from high fault back currents that could flow out of the subsystem as a result of a short circuit on the input power bus 12. Back current may, for example, result when the subsystem in a motor type load generates back EMF when the input bus 12 is shorted. To provide this additional protection, fault switch 2 is comprised of two back-to-back switches driven independently by the power converter 7. Here, it should be noted that opening a switch, or placing it in an OFF state, may refer to applying a high impedance in one direction only. This is typically accomplished using commonly known transistor related technologies, such as FETS, CMOS, JFET, MOSFET, bipolar transistors, etc. Accordingly, to obtain bi-directional fault protection, two such switches in series oriented opposingly may be used. The power converter 7 controls each switch independently according to the direction of flow of the fault current. The fault current detector 5 and current sense circuit 6 are configured to sense bidirectional fault currents.

In addition, the bi-directional fault protection circuit may be configured to manage an AC subsystem with minor modifications which could be readily performed by one having ordinary skill in the art.

Accordingly, the integrated fault protection circuit of the present invention provides bus protection and power in one integrated circuit package, thus reducing the cost and complexity of performing these functions.

While the present invention has been described in detail with reference to the preferred embodiments, they represent mere exemplary applications. Thus, it is to be clearly understood that many variations can be made by anyone having ordinary skill in the art while staying within the scope and spirit of the present invention as defined by the appended claims.

What is claimed is:

1. An integrated fault protection circuit, comprising:
    a fault switch interposed between an input power source and an electronic subsystem power bus;
    a power converter in the electronic subsystem power bus and converting power derived therefrom to at least one voltage output to supply power to the electronic subsystem and at least one fault protection output controlling the fault switch;
    wherein when the out of range current is detected on the electronic subsystem bus, the fault detection circuit instructs the power converter via the at least one fault detection output, to open the fault switch, thereby isolating the input power from the electronic subsystem bus; and
    a time delayed start switch interposed between the input power source and the power converter to provide power to the power converter for a predetermined time period after the input power in initially activated;
    wherein during said predetermined time period the power converter controls the fault switch to provide power to the power converter from the input power source via the subsystem power bus, such that when the predetermined time period expires, power is no longer supplied to the power converter via the start switch and power is supplied via the fault switch only.

2. The integrated fault circuit of claim 1, further comprising:
    a control relay operative to interrupt power between the input power source and the fault switch.

3. The integrated fault circuit of claim 1, further comprising:
    a control relay operative to interrupt power between the input power source and both the fault switch and the time delayed start switch.

4. The integrated fault circuit of claim 2, wherein the control relay is a latching relay, requiring only control pulses to change state.

5. The integrated fault circuit of claim 3, wherein the control relay is a latching relay, requiring only control pulses to change state.

6. The integrated fault circuit of claim 1, wherein the fault detection circuit is comprised of:
    a current sensing circuit to detect an operating current of the electronic subsystem power bus; and
    a fault current detector to monitor the current sensing circuit to determine if the operating current is the out of range current.

* * * * *